United States Patent
Danet

(10) Patent No.: US 10,759,538 B2
(45) Date of Patent: Sep. 1, 2020

(54) SYSTEM FOR SECURING A SEAT, FOR EXAMPLE, FOR AN AIRPLANE AND SEAT COMPRISING SUCH A SYSTEM

(71) Applicant: Attax, Carrieres sur Seine (FR)

(72) Inventor: Romain Danet, Maisons-Laffitte (FR)

(73) Assignee: ATTAX, Carrieres sur Seine (FR)

( * ) Notice: Subject to any disclaimer, the term of this patent is extended or adjusted under 35 U.S.C. 154(b) by 0 days.

(21) Appl. No.: 16/184,950

(22) Filed: Nov. 8, 2018

(65) Prior Publication Data

US 2019/0144119 A1 May 16, 2019

(30) Foreign Application Priority Data

Nov. 10, 2017 (FR) .................................... 17 60596

(51) Int. Cl.
*B64D 11/06* (2006.01)
*F16B 2/02* (2006.01)
(52) U.S. Cl.
CPC ............ *B64D 11/0696* (2013.01); *F16B 2/02* (2013.01)
(58) Field of Classification Search
CPC .. B64D 11/0696; Y02T 50/46; B60N 2/01558
See application file for complete search history.

(56) References Cited

U.S. PATENT DOCUMENTS

| | | | |
|---|---|---|---|
| 3,605,637 A | 9/1971 | Prete, Jr. | |
| 4,708,549 A | 11/1987 | Jensen | |
| 5,169,091 A | 12/1992 | Beroth | |
| 5,871,318 A * | 2/1999 | Dixon | B60N 2/01558 244/118.1 |
| 7,785,053 B2 * | 8/2010 | Hudson | B64D 11/0696 410/104 |
| 9,546,000 B2 * | 1/2017 | Shih | B64D 11/0696 |
| 10,189,375 B2 * | 1/2019 | Stubbe | B64D 11/0696 |
| 2007/0138821 A1 * | 6/2007 | Mejuhas | B64D 11/0696 296/65.01 |

FOREIGN PATENT DOCUMENTS

| | | |
|---|---|---|
| DE | 10 2008 023256 A1 | 11/2009 |
| EP | 3050799 A1 | 8/2016 |
| FR | 2 953 488 A1 | 6/2011 |

OTHER PUBLICATIONS

French Application No. 17 60596, Rapport de Recherche Prélminaire, May 2, 2018, 3 pages.

* cited by examiner

Primary Examiner — Amy J. Sterling
(74) Attorney, Agent, or Firm — Soquel Group LLC

(57) ABSTRACT

A system including a base provided with the means in the form of clamping and locking jaws for clamping and locking of the system into position in the rail, the means in the form of clamping jaws being movable between a first position and a second position by making use of maneuvering means that are operable by an operator between an unlocking position and a locking position, wherein the maneuvering means includes a clamping screw engaged in a hole and adapted so as to cooperate with a threaded hole and in that it has a smooth section in order to allow the screwing thereof into the threaded hole only when the base and the means in the form of clamping jaws are in the correct position of fastening in the rail.

10 Claims, 5 Drawing Sheets

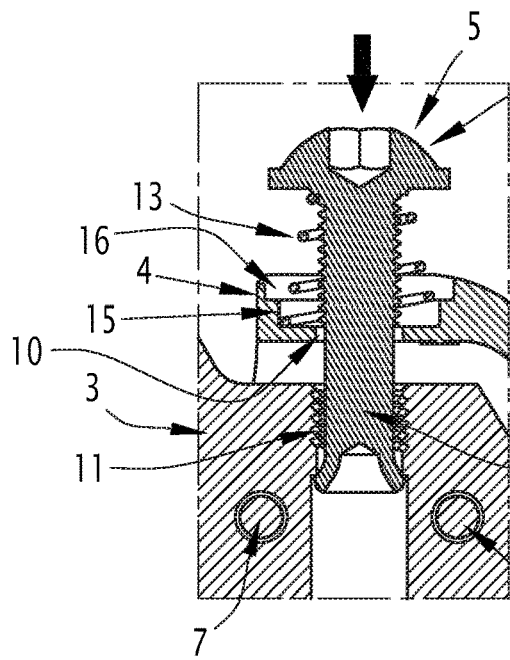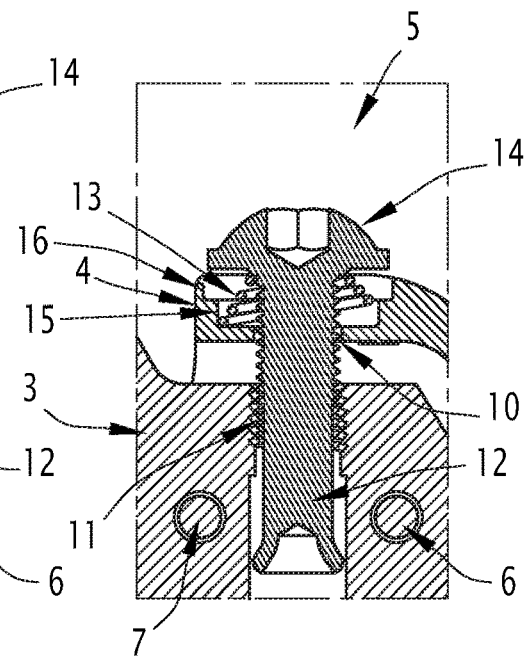
FIG.6          FIG.7
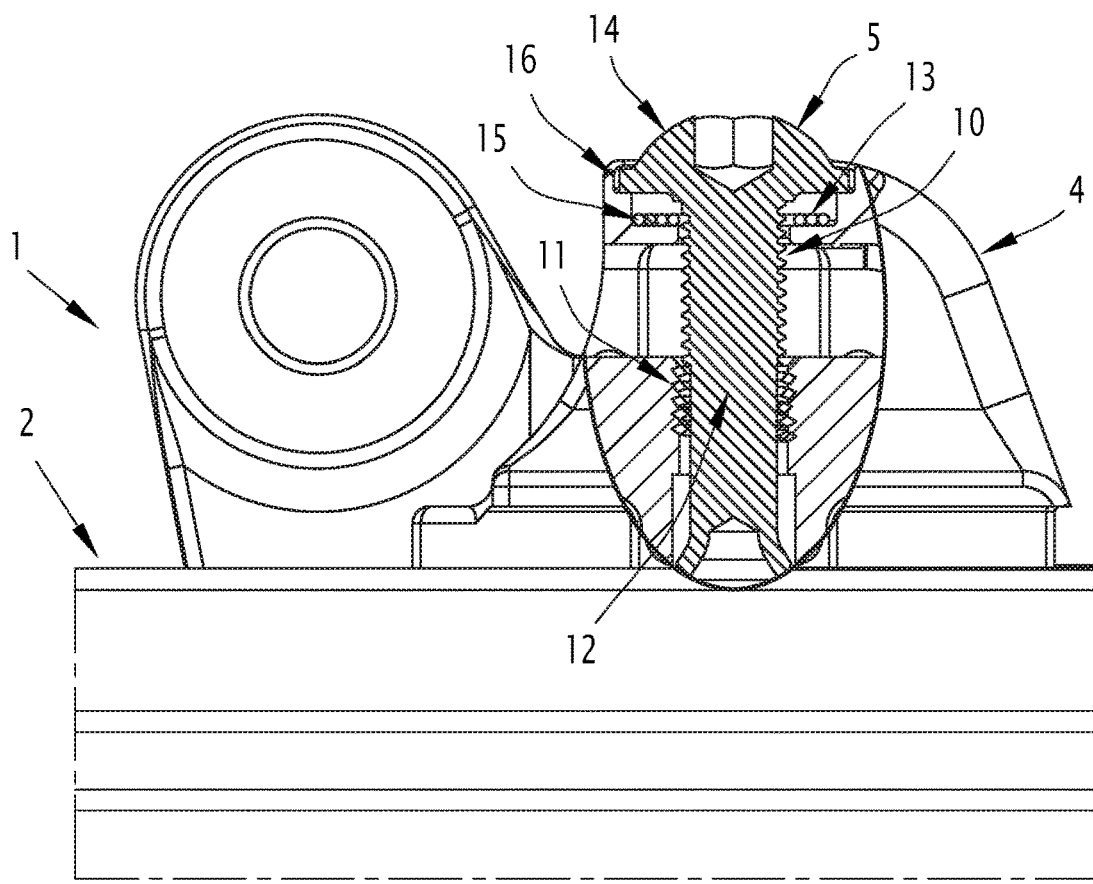
FIG.8

SYSTEM FOR SECURING A SEAT, FOR EXAMPLE, FOR AN AIRPLANE AND SEAT COMPRISING SUCH A SYSTEM

CROSS-REFERENCE TO RELATED APPLICATIONS

This application claims priority of French Patent Application No. 17 60596, filed on Nov. 10, 2017.

FIELD OF THE INVENTION

The present invention relates to a seat securing system for securing, in particular an aircraft seat, and a seat comprising at least one such system.

BACKGROUND OF THE INVENTION

Already known in the state of the art, are seat securing systems for such type of applications, which are adapted so as to ensure the securing of a seat in a rail of the rest of the aircraft.

As a general rule, such a securing system in particular comprises of a base provided with the means in the form of clamping and locking jaws for clamping and locking of the system into position in the rail, by gripping the latter between the base and these means in the form of clamping jaws.

The base and the means in the form of clamping jaws are then movable relative to each other, between a first drawn-apart position for mounting/dismounting of the system in/from the rail, and a second drawn-together position for locking the system, by clamping around the rail, by making use of maneuvering means that are operable by a mounting/dismounting operator.

In the simplest versions of these securing systems, such as for example, in the one described in the patent document FR 2 953 488 filed in the name of the applicant, these maneuvering means that are operable by the mounting/dismounting operator in order to ensure the locking of the system in position, are formed by a clamping screw and are therefore movable between an unlocking position and a locking position for unlocking/locking of the system, by screwing with the help of, for example, any tool that is operated by the mounting/dismounting operator.

According to other embodiments, these means include cam means, lever means, etc.

However, all of these known systems have a certain number of disadvantages in particular in terms of the ease and reliability of this mounting/dismounting.

SUMMARY OF THE DESCRIPTION

The object of the invention is therefore to resolve these problems.

To this end, the object of the invention is related to a seat securing system for securing, in particular an aircraft seat, in a rail of the rest of this aircraft, of the type comprising of a base provided with the means in the form of clamping and locking jaws for clamping and locking of the system into position in the rail, by gripping the latter between the base and these means in the form of clamping jaws, the means in the form of clamping jaws being movable relative to the base between a first drawn-apart position for mounting/dismounting of the system in/from the rail and a second drawn-together position for locking the system, by clamping around the rail, by making use of maneuvering means that are operable by a mounting/dismounting operator between an unlocking position and a locking position for unlocking/locking of the system, characterized in that the maneuvering means that are operable by the mounting/dismounting operator comprise a clamping screw for clamping the means in the form of clamping jaws, engaged in a hole of the means in the form of clamping jaws and adapted so as to cooperate with a threaded hole of the base and in that it has a smooth section of lost motion in order to allow the screwing of this screw into the threaded hole of the base only when the base and the means in the form of clamping jaws are in the correct position of fastening in the rail.

According to other characteristic features of the system according to the invention, taken into consideration alone or in combination:
  the hard spot crossing means are provided between the base and the means in the form of clamping jaws in order to maintain these means in the form of clamping jaws in their first drawn-apart position for mounting/dismounting of the system;
  the hard spot crossing means comprise at least one ball spring plunger placed in a corresponding hole of the base;
  the hard spot crossing means comprise two ball spring plungers;
  the means in the form of clamping jaws have lateral maneuvering parts projecting outward that allow for the operator to move the latter between their two positions;
  a resilient biasing member is interposed between the means in the form of clamping jaws and the head of the screw;
  the means in the form of clamping jaws comprise, associated with the hole for the through-passage of the screw, a first counterbore for receiving the biasing member and a second counterbore for receiving the head of the screw;
  the periphery of the head of the screw carries information for unlocking of the system, disappearing in the corresponding second counterbore of the means in the form of clamping jaws, in the position of locking of the system.

According to another aspect the object of the invention also relates to an aircraft seat which comprises at least one such securing system.

BRIEF DESCRIPTION OF THE DRAWINGS

The invention will be better understood upon reading the description which follows, provided solely by way of example and with reference being made to the appended drawings, in which:

FIGS. 5, 6, 7 and 8 illustrate the mounting and locking of such a securing system;

DETAILED DESCRIPTION

Figure 1:
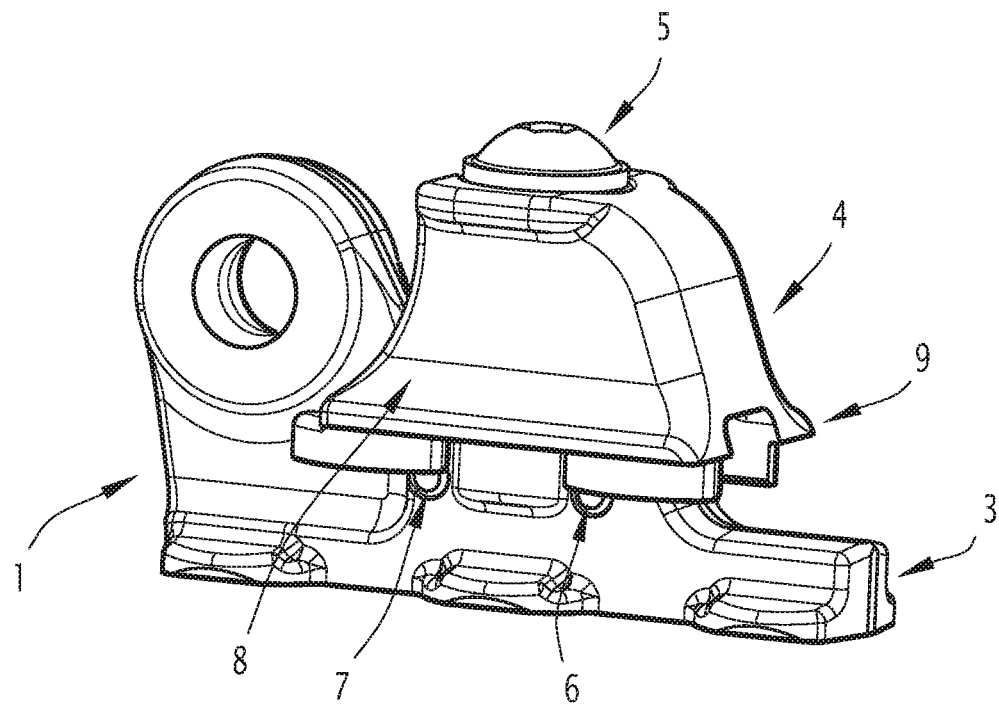
FIG. 1 represents a perspective view of a securing system according to the invention in dismounted position.

In these figures, a seat securing system for securing, in particular an aircraft seat, in a rail of the rest of this aircraft has effectively been illustrated.

In these figures, the securing system is denoted by the general reference numeral 1 and the rail of the rest of the aircraft is denoted by the general reference numeral 2.

In fact this system comprises a base denoted by the general reference numeral 3, which is provided with the means in the form of clamping and locking jaws for clamping and locking of the system into position in the rail, by gripping the latter between the base and these means in the form of clamping jaws.

The means in the form of clamping jaws are denoted by the general reference numeral 4 in these figures.

Figure 2:
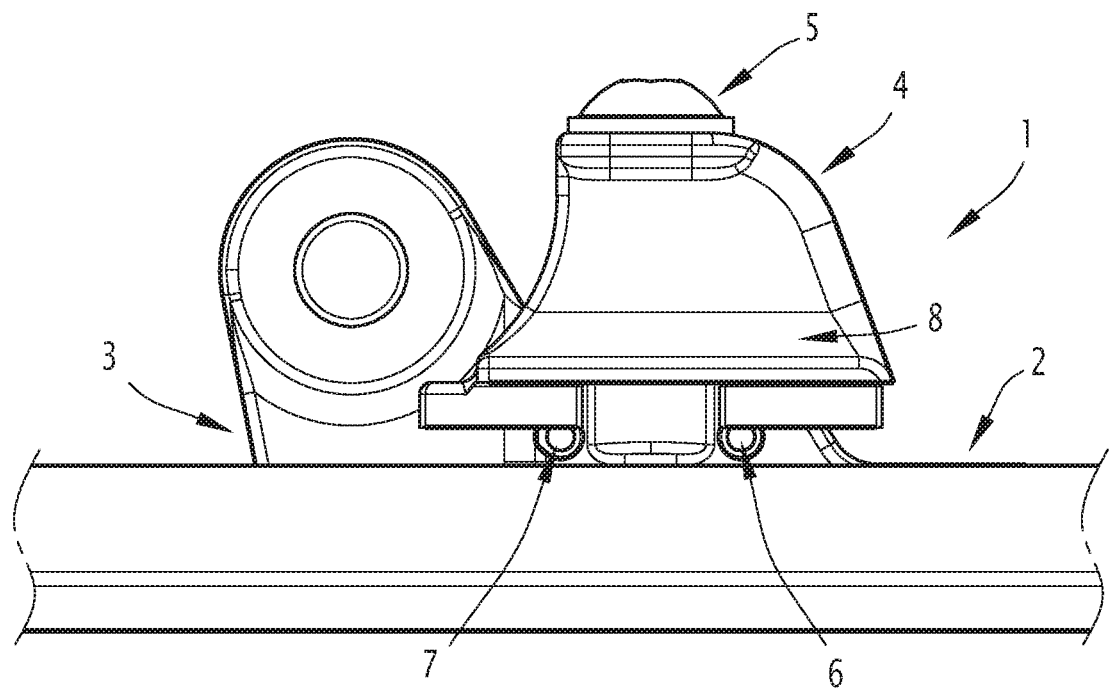
FIG. 2 represents a view from the side of such a system in the mounted position, mounted in a rail but unlocked.
Figure 3:
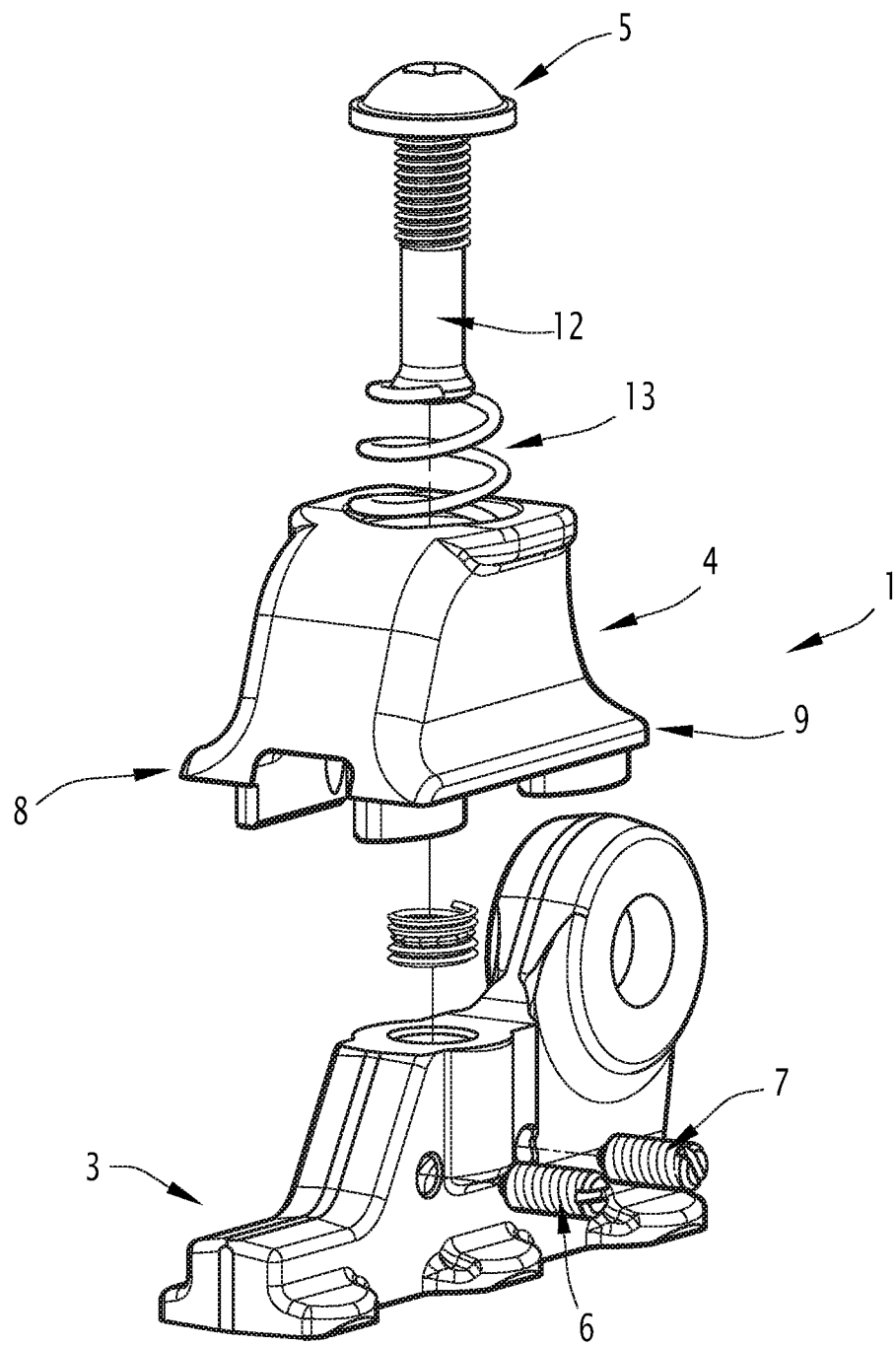
FIG. 3 represents an exploded perspective view of such a securing system.
Figure 4:
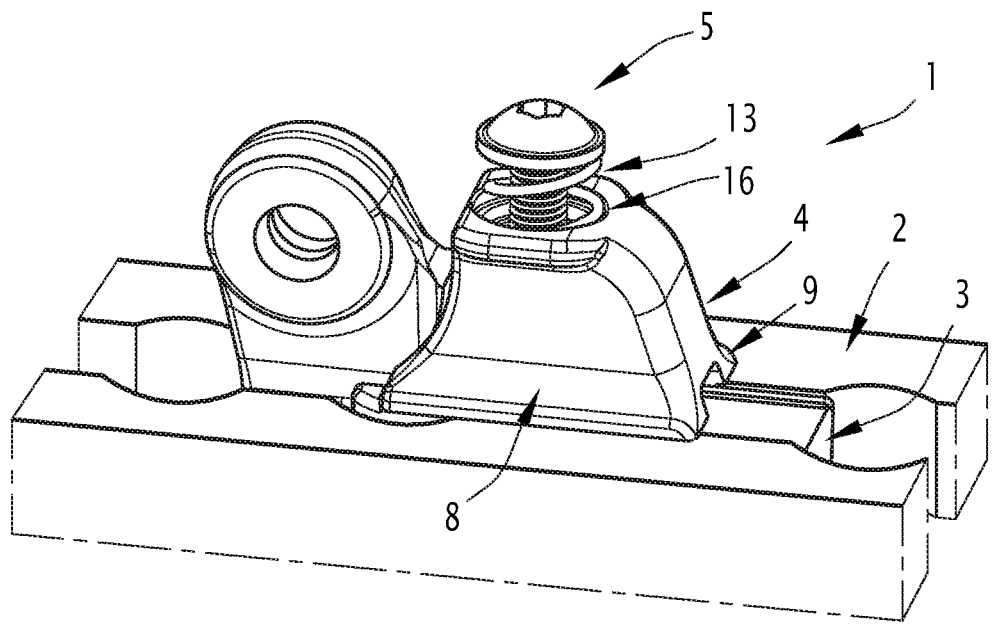
FIG. 4 represents a perspective view of such a securing system while being mounted in a rail.
Figure 5:
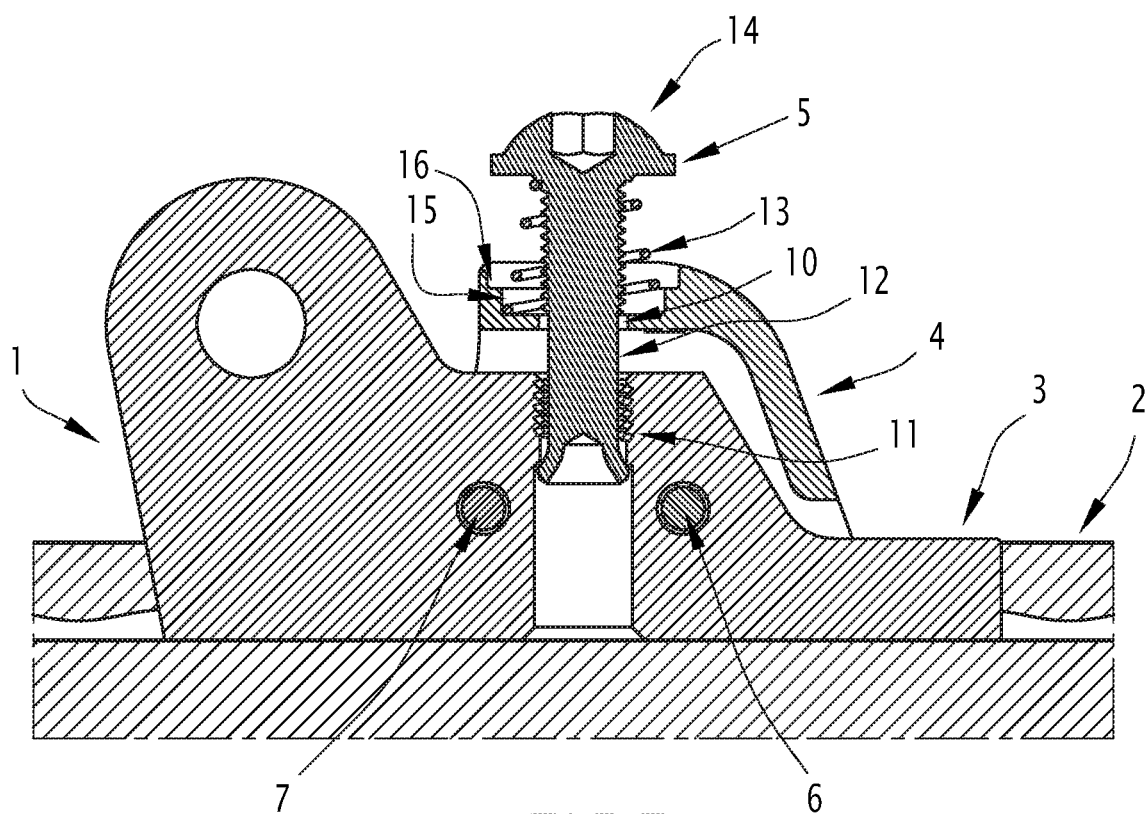

In fact and as has been illustrated in these figures, the means in the form of clamping jaws are movable relative to the base, between a first drawn-apart position for mounting/dismounting of the system in/from the rail, as shown for example in the FIGS. 1 and 2, and a second drawn-together position for locking the system by clamping around the rail, as has been illustrated in FIGS. 4 and 8 for example.

This movement of these means in the form of clamping jaws is obtained by making use of maneuvering means that are operable by a mounting/dismounting operator, in order to move the system between an unlocking position and a locking position in the rail.

In fact and as it will be described in greater detail in subsequent sections, these maneuvering means include for example a screw denoted by the general reference numeral 5 in these figures.

As has also been illustrated in these figures, the hard spot crossing means are provided between the base and the means in the form of clamping jaws in order to maintain these means in the form of clamping jaws in their first drawn-apart position for mounting/dismounting of the system.

This makes it possible to facilitate the mounting and dismounting of the system.

Indeed it is easier for the operator to mount and dismount the system if these two parts are drawn-apart.

These hard spot crossing means comprise for example at least one ball spring plunger, placed in a corresponding hole of the base.

This hole traverses for example the base from side to side.

In the exemplary embodiment illustrated in these figures, two ball spring plungers are used.

These two plungers are denoted by the general reference numerals 6 and 7 in these figures.

Figure 10:
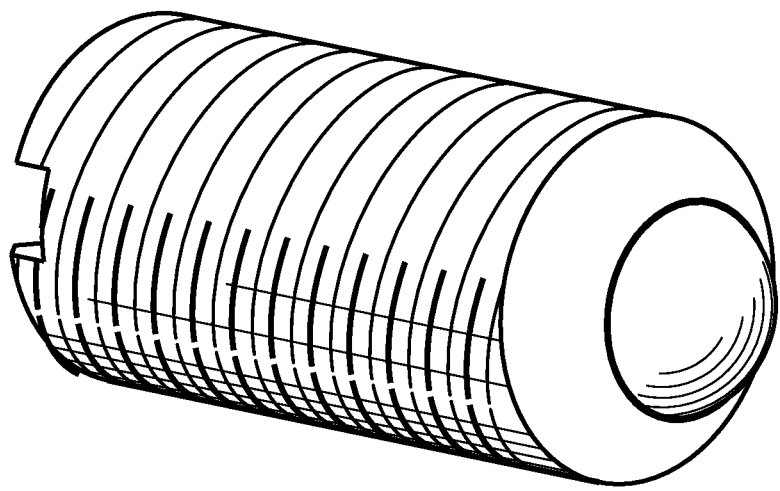
FIG. 10 illustrates a perspective view of an example of a ball spring plunger of such a securing system.

An example of a ball spring plunger is depicted in FIG. 10.

In fact, these ball spring plungers have for example a threaded external body and which is thus then adapted so as to be engaged in a threaded hole of the base, in a conventional manner.

Thus, these hard spot crossing means 6 and 7 make it possible to maintain the means in the form of clamping jaws 4 in their position drawn—apart from the base 3, during the operations of mounting in position and dismounting of this system in/from the rail, by the operator.

Once in the mounting position, the mounting operator can then press on these means in the form of clamping jaws in order to move them to their second drawn-together position drawn-together with the base, for locking the securing system by clamping around the rail.

To this end it will be noted that the means in the form of clamping jaws 4 may also comprise for example lateral parts projecting outwards 8 and 9, such as wings, facilitating the maneuvering and the moving of these means in the form of clamping jaws, by the operator.

It is thus conceivable that the operator may press on the means in the form of clamping jaws, which makes it possible for the balls of the ball spring plungers to retract, in order to release the passage and thus enable the moving of these means in the form of clamping jaws to their second position.

During the dismounting, the operator can pull on the means in the form of clamping jaws 4 in order to move them from their second drawn-together position to their first drawn-apart position, there again passing the stopping point defined by the balls of the plungers 6 and 7.

As has previously been indicated, the maneuvering means that are operable by the mounting/dismounting operator for clamping the means in the form of clamping jaws comprise, for example, a screw 5.

The latter is illustrated in greater detail in FIGS. 4, 5, 6, 7 and 8, this screw 5 is engaged in a hole 10 of the means in the form of clamping jaws and is adapted so as to cooperate with a threaded hole of the base, this threaded hole being denoted by the general reference numeral 11.

In fact this screw 5 has a smooth section of lost motion, denoted by the general reference numeral 12 in these FIGS. 5, 6, 7 and 8, in order to allow the screwing of this screw 5 into the threaded hole 11 of the base, only when base and these means in the form of clamping jaws are in the correct position of fastening in the rail.

This makes it possible to prevent any incorrect position of fastening of the system in the rail by allowing the clamping only when the form is well positioned in the rail.

Such a position is shown in greater detail in FIG. 8.

The means in the form of clamping jaws are in fact not in the correct position in the rail, and are supported on it, in a manner such that they prevent the assembly from descending down and the threaded part of the screw 5 from engaging with the threaded hole 11.

A resilient biasing member such as a helical coil spring denoted by the general reference numeral 13, is interposed between the means in the form of clamping jaws and the head of the screw, this screw head being denoted by the general reference numeral 14.

This spring makes it possible to bias the means in the form of clamping jaws towards its second position.

Figure 9:
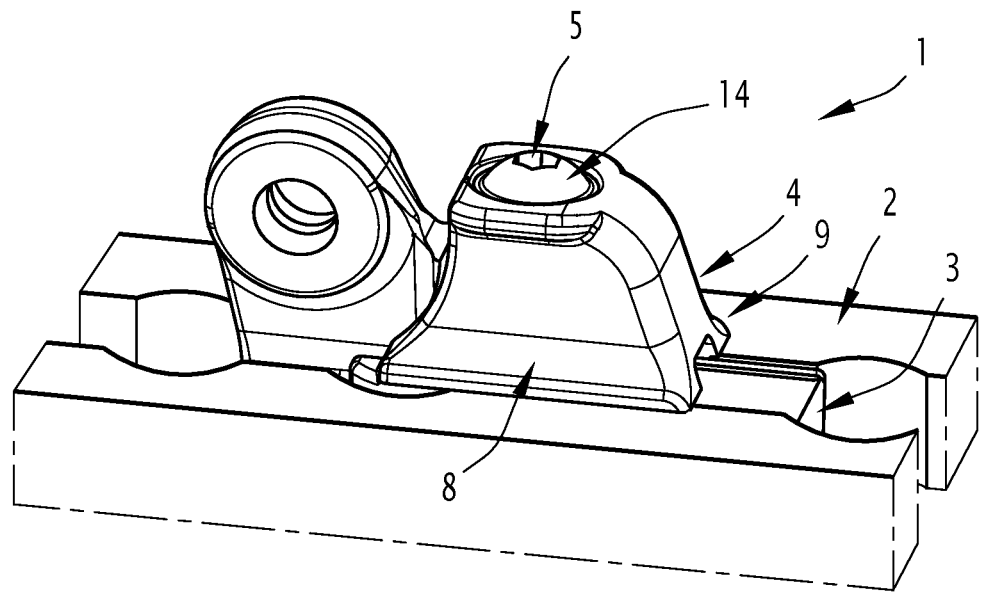
FIG. 9 illustrates a perspective view of such a securing system in the mounted position, mounted and locked in a rail.

In fact and as it has been illustrated, the means in the form of clamping jaws comprise, associated with the hole 10 for the through—passage of the screw 5, a first counterbore 15 for receiving this spring 13 and a second counterbore 16 for receiving the head of the screw 5 in the locking position, as it has been illustrated in FIG. 9.

Thus, once the system has been set in place in the rail, and once it has been positioned correctly in this rail, the operator can push the screw 5 against the biasing of the spring 13, in order to engage the threaded portion of this screw 5 in the threaded hole 11 of the base and thus enable the clamping of these means in the form of clamping jaws on the base, by gripping the rail between the base and the means in the form of clamping jaws.

It will also be noted that the periphery of the head of the screw 5 may bear information, for example in terms of color, for unlocking of the system, that disappears into the corresponding counterbore 16 of the means in the form of clamping jaws, in the position of locking of the system.

In analogous fashion, color indications may also be provided on portions of the means in the form of clamping jaws, which are meant to disappear in the rail when these means are in the correct position in the latter.

This makes it possible, for example, to indeed determine well the position of locking or unlocking of the system.

It goes without saying of course that a number of other embodiments of this system may be envisaged.

The invention claimed is:

1. A seat securing system comprising comprising:
a base comprising clamping jaws for clamping and locking the system into position in a rail, by gripping the rail between the base and the clamping jaws, the clamping jaws being movable relative to the base between a first drawn-apart position for mounting the system in the rail and for dismounting the system from the rail and a second drawn-together position for locking the system, by clamping around the rail, by making use of an actuator that is operable by an operator between an unlocking position and a locking position of the system;
said actuator comprising a clamping screw for clamping said clamping jaws, engaged in a hole of said clamping jaws and adapted so as to cooperate with a threaded hole of said base and wherein said clamping screw has a smooth section of lost motion in order to allow the screwing of said clamping screw into the threaded hole of said base only when said base and said clamping jaws are in the correct position of fastening in the rail; and a biasing member interposed between said clamping jaws and the head of said clamping screw to bias the clamping jaws against the rail.

2. The seat securing system according to claim 1, wherein hard spot crossing is provided between said base and said clamping jaws in order to maintain said clamping jaws in their first drawn-apart position for mounting and dismounting of the system.

3. The seat securing system according to claim 2, wherein said hard spot crossing comprises at least one ball spring plunger placed in a corresponding hole of said base.

4. The seat securing system according to claim 3, wherein said hard spot crossing comprises two ball spring plungers.

5. The seat securing system according to claim 1, wherein said clamping jaws have lateral maneuvering parts projecting outward that allow the operator to move said clamping jaws between the drawn-apart and drawn-together positions.

6. The seat securing system according to claim 5, wherein said clamping jaws comprise, associated with the hole for the through-passage of said clamping screw, a first counterbore for receiving said biasing member and a second counterbore for receiving the head of said clamping screw.

7. The seat securing system according to claim 6, wherein the periphery of the head of said clamping screw carries information for unlocking the system, disappearing in the corresponding second counterbore of said clamping jaws, in the locking position of the system.

8. An assembly comprising:
an aircraft seat, comprising at least one seat securing system according to claim 1; and
a rail, wherein said aircraft seat is secured to said rail by said at least one seat securing system.

9. The seat securing system according to claim 1, wherein said clamping screw comprises a head and an end opposite the head, the smooth section being provided at the end of said clamping screw.

10. The seat securing system according to claim 1, wherein said clamping screw comprises a threaded section, the threaded section being provided between the smooth section and the head of said clamping screw.

* * * * *